United States Patent [19]
Choboter

[11] Patent Number: 6,118,101
[45] Date of Patent: *Sep. 12, 2000

[54] VINYL COMPOSITION TILE HEATING SYSTEM

[76] Inventor: George E. Choboter, 143 Hawkmouth Heights N.W., Calgary, Alberta, Canada, T3G 3S4

[ * ] Notice: This patent issued on a continued prosecution application filed under 37 CFR 1.53(d), and is subject to the twenty year patent term provisions of 35 U.S.C. 154(a)(2).

[21] Appl. No.: 08/682,049

[22] Filed: Jul. 10, 1996

Related U.S. Application Data

[63] Continuation-in-part of application No. 08/193,524, Feb. 8, 1994, abandoned.

[51] Int. Cl.$^7$ ........................................................ A21B 1/00
[52] U.S. Cl. ................................................................ 219/395
[58] Field of Search .................................... 219/405, 395, 219/383, 121.67, 121.61; 165/918, 919; 30/171

[56] References Cited

U.S. PATENT DOCUMENTS

| | | | |
|---|---|---|---|
| 2,646,621 | 7/1953 | Catanese | 30/317 |
| 2,674,794 | 4/1954 | Baker | 30/171 |
| 2,776,478 | 1/1957 | Mercer | 30/61 |
| 3,162,947 | 12/1964 | Gringer | 30/171 |
| 3,530,578 | 9/1970 | Katz | 30/171 |
| 4,203,486 | 5/1980 | Rubbright et al. | 165/48 R |
| 4,238,669 | 12/1980 | Huntley | 219/405 |
| 4,580,035 | 4/1986 | Luscher | 219/398 |
| 5,213,197 | 5/1993 | Mohri | 198/499 |
| 5,379,085 | 1/1995 | Matsuda et al. | 354/319 |
| 5,419,004 | 5/1995 | Fox | 15/236.01 |

*Primary Examiner*—Teresa Walberg
*Assistant Examiner*—Daniel Robinson
*Attorney, Agent, or Firm*—Terry M Gernstein

[57] ABSTRACT

A method and apparatus is provided for heating vinyl composition tiles which are then amenable to cutting with a knife along complex contours without damaging the tiles. A stack of heating trays are located within a protective housing. The housing is supported on wheel means for ease of transport about the worksite and has one open side so that tiles can be loaded onto each of the trays. A discrete electrical heating element heats each tray and tile to a uniform temperature which renders the tile sufficiently elastic to be cut along any desired contour without fracturing. The trays are spaced appropriately so that tiles can be individually seized for cutting by the installer. The combination of the number of trays and the heating element's heat transfer capability enables an installer to repeatedly seize a sufficiently heated tile, re-load the vacant tray, and then seize another heated tile from the next sequential tray on a cyclical, sustainable basis. For added convenience, it is preferable that each tray be provided with a mechanical tile extractor and that the housing contain a cold tile storage compartment.

3 Claims, 3 Drawing Sheets

VINYL COMPOSITION TILE HEATING SYSTEM

CROSS REFERENCE TO RELATED APPLICATION

This application is a continuation-in-part of application Ser. No. 08/193,524, filed Feb. 8, 1994 and now abandoned.

FIELD OF THE INVENTION

The present invention relates to a system for heating whole vinyl composition tiles, thereby rendering the tiles elastic and amenable for cutting of complex contours therein without fracture.

BACKGROUND OF THE INVENTION

Floor tiles, commonly known as vinyl composition tiles ("VCT") are typically 12" by 12" by ⅛" thick. The composition of the tiles makes them brittle at room temperature and elastic at elevated temperatures.

In a typical tile installation covering 1000 ft², about 7.0 hours are required to lay the first 970 of the tiles and a further 60 minutes are required to lay the remaining 30 tiles. As shown in Prior Art FIG. 1, remaining tiles a require custom fitting around non-linear features b (such as around circular drains), and along linear multi-stepped contours c (such as around door casings) before they can be installed into corresponding space s. Cutting these complex contours b,c is not possible using a commercial tile cutter which is capable only of performing linear cuts which extend across the entire tile.

About ⅔ of the time required to custom-fit the remaining tiles a is consumed in heating the tiles (about 1 to 2 minutes per tile) to an sufficiently elastic state to permit cutting with a razor knife. The success of this laborious heating procedure is dependent upon the contour and the lineal length of the cut, and the skill of the installer.

To date, heating means such as a hand-held propane torch or a heat gun d (heated air blower made especially for flooring) have been used for heating tile a locally along the proposed lines e for cutting. The heat gun provides a localized source of heat, with typical exhaust temperatures being dangerously, yet necessarily, hot (up to about 750° F.).

This heating process is very time consuming and often results in inferior results. Disadvantages, associated with the prior art heating means, include:

- about ⅔ of the time required to fit custom-cut tiles is consumed simply in an effort to heat only a portion of the tiles;
- a high degree of difficulty is involved in uniformly heating the entire length of a long cutting line e without locally overheating one area of the tile, risking physical or aesthetic damage to the tile a, or leaving other areas cool and subject to fracture. The installer must consider multiple variables including the size of the proposed cut, the temperature of the heat source, the distance of the heat source to the tile, and the speed at which the heat source is swept over the tile;
- commercial heat guns d typically require special high amperage circuits (20 Amp) not available at most worksites, requiring the use of adapters f coupled to common 15 Amp circuits, resulting in frequently blown circuits;
- the high exhaust temperature of the heat gun is a safety hazard for the installer, while in use and also when idle. Usually the installer will not attempt to hold the tile during heating to avoid exposure to the heat. Further, heat reflected from the tile causes discomfort for the installer; and
- there is a high potential for damage (heat discoloration and fire) to workplace structures, such as walls g against which tiles a are often supported and to surfaces h upon which the heating means d are temporarily rested.

Therefore, there has long been a need for an improved system of cutting VCT flooring tiles which demonstrates a high rate of success, is more convenient and poses a reduced risk to personnel, the workplace, and the tiles themselves.

SUMMARY OF THE INVENTION

In accordance with the invention, a vinyl composition tile ("VCT") heating assembly is provided for heating VCT tiles which are, when hot, amenable to cutting along complex contours without damaging the tiles.

More particularly, a stack of vertically spaced heat conductive trays is located within and supported by a protective housing. The housing is supported on wheel means for transport about the worksite and has one open side so that tiles can be loaded onto each of the trays. Discrete, electrical heating elements heat the trays for conductively heating the tiles to a uniform elevated temperature, within a predtermined time frame, whereby the tile is sufficiently elastic to be cut with a knife along any desired contour without damage to the tile. The trays are spaced appropriately so that tiles can be individually seized for use (cutting) by the installer. The combination of the number of trays and the heating element's heat transfer capability is selected so that the heating elements are operative to supply heat to the tiles through the trays as required to ensure sustainable, sequentially cyclic operation, whereby if a fully heated tile from an originally fully loaded stack is removed and replaced with a replacement tile, then after all of the original tiles have been removed, cut and installed in sequence, the replacement tile will be ready for cutting. Otherwise stated, by, for example, three trays and appropriate heating elements, the installer can maintain a continuous operation whereby he can sequentially cut and install all three tiles originally in the stack and by the time he reaches the first replacement tile (inserted at the time of removing the first heated tile), it will be fully heated.

Use of the apparatus of the invention results in increased VCT tile installation rates, a reduced impact on the worksite and reduced incidence of damage to the custom-cut tiles.

Broadly stated, the invention is an assembly for heating vinyl composition tiles, having top and bottom faces, for cutting by an installer, comprising: a housing mounted on wheel means for rolling movement, said housing having at least one open side and forming an internal chamber; a stack of vertically spaced, horizontally oriented, heat conductive trays affixed to the housing within the chamber, each tray having top and bottom surface, said tray providing an upper heat transferring surface operative to contact and support substantially the entire bottom face of the tile so that substantially the entire area of the tile will be uniformly and conductively heated, the spacing between each pair of trays being sufficient to accommodate a tile and allow an installer to grasp and remove a tile; a plurality of discrete heating elements, one for each tray, each heating element being in thermal engagement with substantially the entire area of a tray's bottom surface for heating the tray conductively substantially uniformly across its width and length; thermostatic control means for controlling the heat output of the heating elements; the heating elements being operative to supply heat to the tiles through the trays as required to ensure sustainable, sequentially cyclic operation whereby if a fully heated tile from an originally fully loaded stack is removed and replaced with a replacement tile, then after all of the original tiles have been removed, cut and installed in sequence, the replacement tile will be ready for cutting.

The heating apparatus lends itself to an efficient and safe method for heating VCT tiles for cutting along a complex contour line comprising:

initially loading a plurality of original tiles onto a stack of heated trays, one tile per tray;

heating each tile substantially uniformly throughout so that the entire tile is sufficiently elastic to be readily cut along the contour line without fracturing;

removing a first heated tile from its respective heating tray for cutting by an installer, leaving the heating tray temporarily vacant;

loading a first replacement tile onto the vacant heating tray for heating of the first replacement tile;

heating the first replacement tile substantially uniformly throughout;

repeating the steps of removing, loading, and heating tiles from different trays in sequence at each repeat, so that by the time all of the originally heated tiles have been removed, the first replacement tile is now uniformly heated, and so on for each sequentially replaced tile so that a tile is always uniformly heated and available for cutting by the installer.

DETAILED DESCRIPTION OF THE PREFERRED EMBODIMENT

Figure 1:
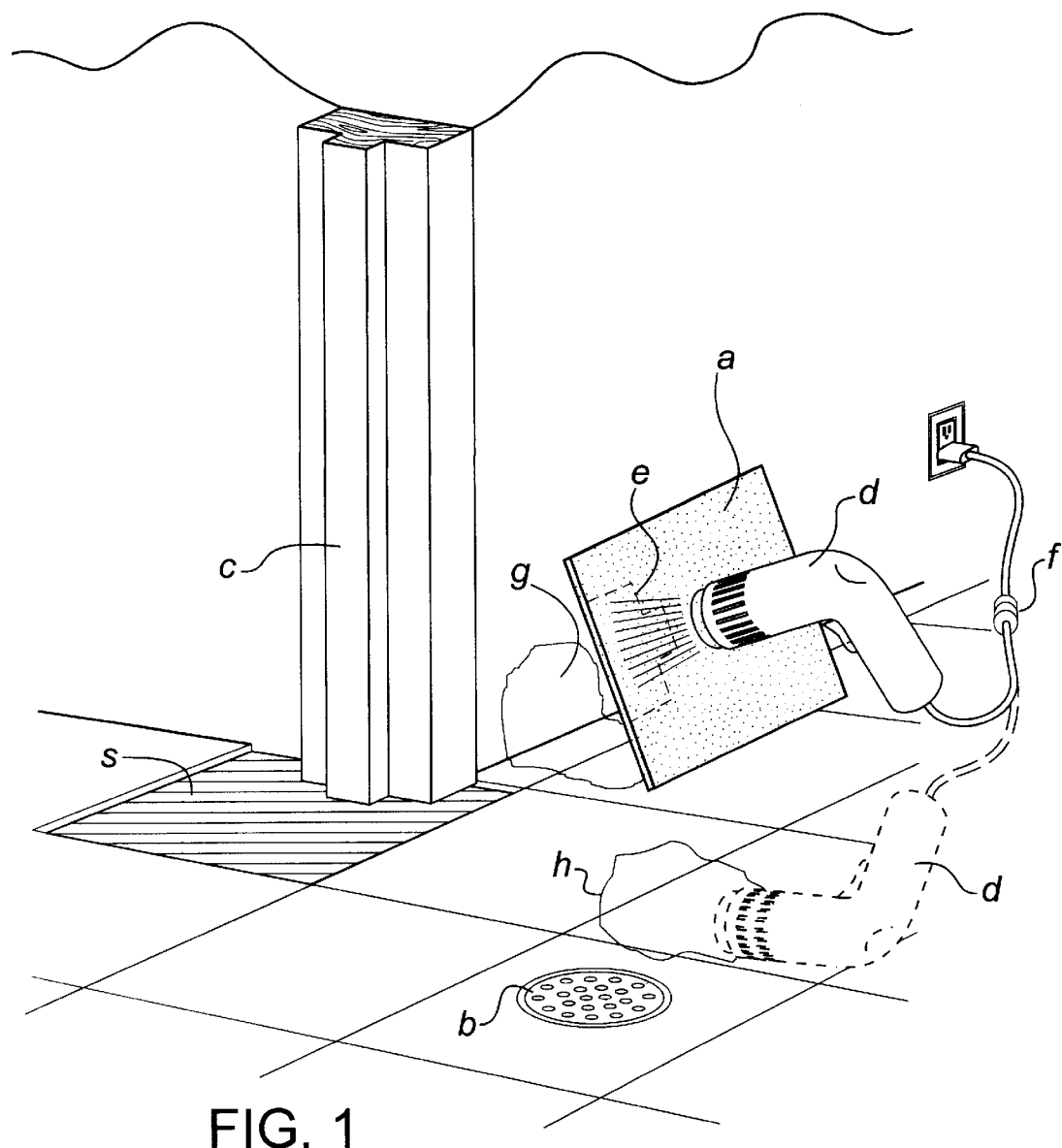
FIG. 1 is a perspective view of a typical vinyl composition tile flooring installation using the system of the prior art.
Figure 2:
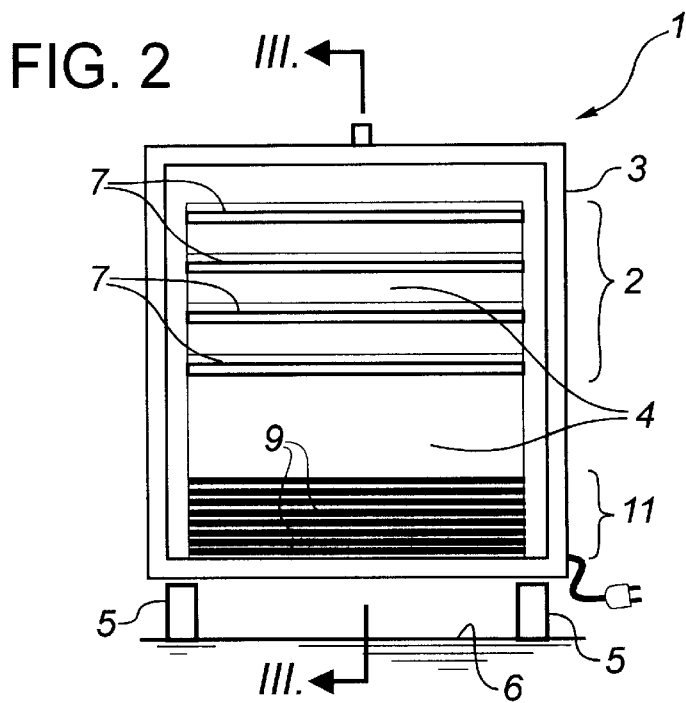
FIG. 2 is a front view of the tile heating assembly of the present invention, showing a stack of heating trays located within and supported by a protective, wheeled housing.
Figure 3:
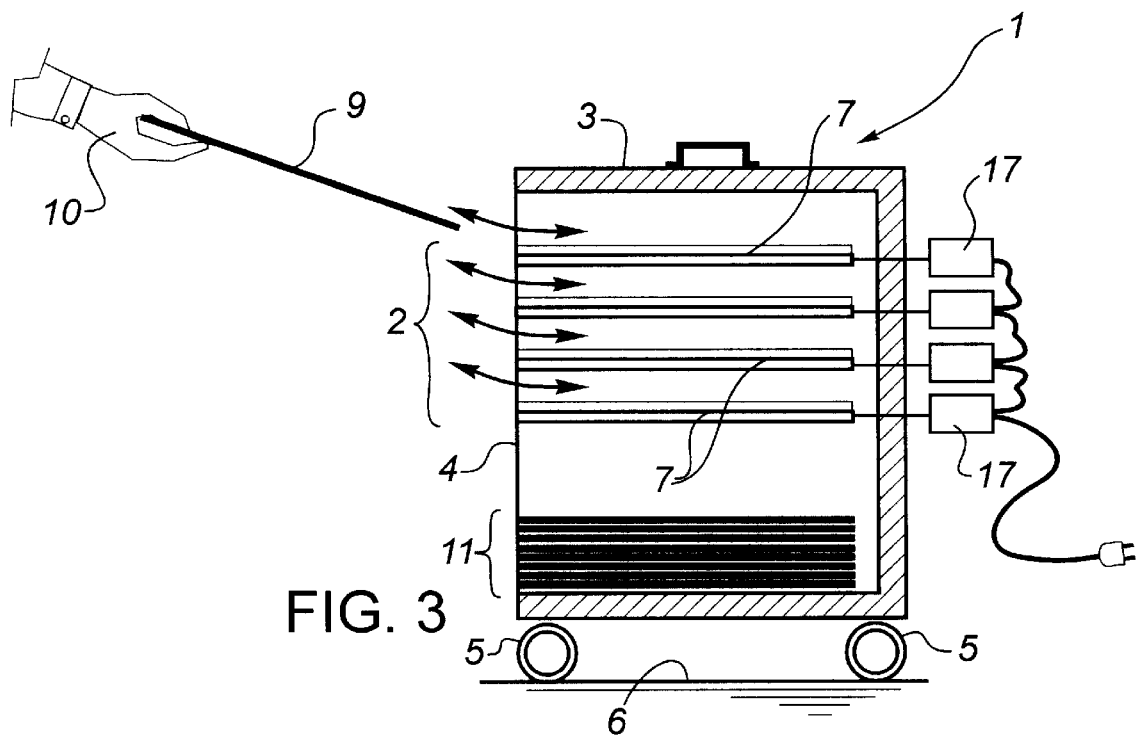
FIG. 3 is a cross sectional view of the tile heating assembly of FIG. 2, taken along line III—III, showing the loading and selecting of tiles.

Having reference to FIGS. 2 and 3, a heating assembly 1 for the heating of vinyl composition ("VCT") tiles is provided. VCT tiles typically comprise a composition of polyvinyl chloride, resin binder and fillers.

Specifically, the assembly 1 comprises a housing 3 forming an internal chamber 30 containing a tile receiving stack 2 of heating trays 7. The housing 3 forms an on one side to permit unrestricted access to the stack 2. The housing 3 is supported on wheel means 5, such as casters, for enabling rolling movement on a worksite floor 6.

The stack 2 comprises a plurality of vertically spaced, horizontally oriented heating, heat conductor trays 7. Each tray is sized to support substantially the entire area of one tile. Individual tiles 9 are placed onto each of the trays 7. Each tray 7 is spaced sufficiently apart from another so that the tiles 9 can be readily accessed with an installer's hands.

Each tray 7 is thermally engaged with a heating element 11 positioned at its bottom surface 12. Each heating element 11 is coextensive with the tile-supporting area of the tray 7 and is contiguous with its bottom surface 12. The heating element 11 is operative to produce heat evenly and uniformly from its entire top surface 13.

More particularly, the tray 7 is formed of light gauge (0.074" thick) aluminum and the heating element 11 comprises a flexible silicone composite sheet within which is encapsulated a resistive electrical heater wire (not shown). The silicone composite sheet is adhesively secured to the tray's bottom surface 12.

A suitable heating element 11 for this purpose is available from Ogden Manufacturing Co., Arlington Heights, Ill., under Part No. RM 574-026 ORANGE. This element is a 10"×10"×1/16" thick, adhesive backed, 120V–350 watt unit. It is compatible with the power supply commonly available at the worksite, which is typically 110 volt AC and 15 amperes.

In summary then, the heating element 11 is operative to supply heat uniformly and evenly from its entire top surface 13 to the heating tray 7 which in turn uniformly heats the tile 9 across its full area.

The heating element 11 is connected with a thermostat 14 for controlling its heat output. The thermostat 14 can be adjusted so that the temperature of the tile 9 may be raised sufficiently so that it may be cut without fracturing.

The housing 3 forms a bottom storage container 15 for retaining a stack of cold tiles. It also functions to provide a cool exterior surface, for the safety of the installer.

Having reference once again to FIGS. 2 and 3, in operation, each of the trays 7 of the assembly 1 is loaded with a tile 9. The heating elements 11 are energised, using thermostats 14. In a short while, each of the tiles 9 is unformily heated to a suitable temperature (about 120 to 150° F.) at which point the entire tile is sufficiently elastic to be cut (typically with a razor knife) along a contour line (not shown) without fracturing.

At these relatively low temperatures, achieving substantial uniformity of temperature across the tile is important. The optimal tile temperature may be determined, prior to commencing installation, by trial and inspection.

When a tile 9 is needed by the installer, one is readily selected and removed from its tray 7, by access through the open side 4 of the housing 3. The installer can re-load the vacant tray 7 with a replacement tile. The heated tile 9 can be immediately and easily cut along the desired contour line.

If the rate of installation is slow, then it is possible for the replacement tile to be heated uniformly and to a sufficient temperature by the time the installer requires another tile. Normally however, an installer will require tile at a faster rate than the heating element 11 can heat the individual replacement tile 9.

Therefore, in the normal situation, when an installer requires heated tiles on a more rapid and frequent basis, the installer may select an already heated tile 9 from one of the additional trays 7. Optimally and most conveniently, the installer would select the next adjacent tile. The vacant tray would be loaded with a replacement tile.

The installer can repeat this procedure, selecting additional heated tiles from the next sequential tray as required. A replacement tile would be loaded back onto each vacant tray.

The replacement tiles, which the installer has been re-loading, are heated while the installer cuts and fits heated tiles. Given enough time, these replacement tiles become sufficiently heated and are thus available for repeated selection and use on a sustainable, sequentially cyclic basis.

If an installer can cut and fit a tile in 0.5 minutes, and the heating element is capable of heating a tile to a cutable uniform temperature in 1.5 minutes, then the minimum number of trays required to always provide a heated tile on a sustainable basis is 1.5/0.5=3 trays.

Figure 4:
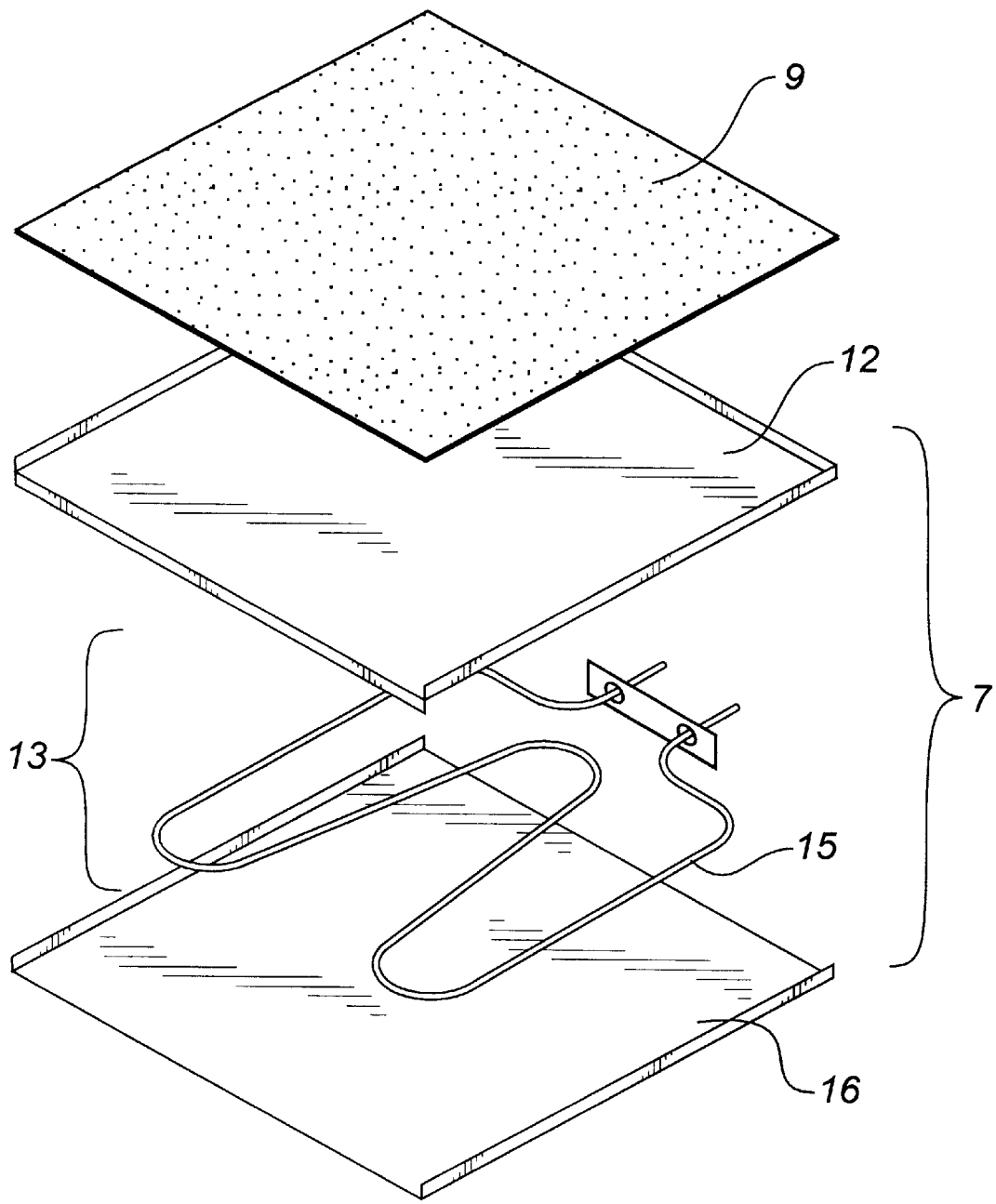
FIG. 4 is an exploded perspective view of a heater, a heating tray, a tile and a tile extracter. The housing has been mostly cut away.

In the embodiment shown in FIG. 4, a mechanical tile extractor 16 is provided at each tray for assisting in the removal of the heated tile 9 from the tray. Each extractor 16 is mounted either from the top of the housing 3 or the adjacent tray 7 above, and is sufficiently spaced above each tray 7 for facilitating loading of a tile 9 therebetween. The extractor 16 comprises a guided pull bar 17, having a grasping end 18, extending outside the housing's open side 4, and a tile engaging end 19, terminating at the rear of the housing 3. The pull bar 17 is movable, between a inwardly spring-biased position A at rest and a tile-selecting position B, when pulled by the grasping end 18. The tile engaging end 19 is fitted with a transverse rake 20 which depends downwardly sufficiently to engage the tile 9 without interference with the tray 7.

When the pull bar 17 is pulled to the tile-selecting position B, the rake 20 pushes the tile 9, so that it is displaced a short distance out of the housing's open end for easier and safer seizing of the tile by the installer. When released, the pull bar 17 retracts to its rest position A, to permit re-loading of the tray with a replacement tile.

In summary, the present invention is characterised by the following advantages over the prior art:

- by providing a stack of heating trays and tiles and by accessing tile in a sequential and cyclical manner, a continuous and sustainable supply of heated tiles is available to the installer, eliminating the valuable time previously lost to individual heating of tiles;
- tiles can be maintained in a heated state and yet can be readily and conveniently accessed though the open side of the housing without interrupting the installer's pace;
- the uniformly heated tile is cut more easily along the entire length of a contour line and with greater success;
- the system is maintained at non-hazardous temperatures, is contained and does not impact adversely on the worksite; and
- the wheeled housing can be readily rolled to a convenient position adjacent the worksite, while further providing a supply of additional tiles.

Further, as an illustration of the economic benefits of the present invention to a tile installer, the following example is provided. For a typical tile installation covering 1000 ft$^2$, the following economics were observed:

|  |  | Prior Art | Present Invention |
|---|---|---|---|
| Uncut tiles | (# tiles) | 970 | 970 |
| Uncut Install time req'd | (hours) | 7.0 | 7.0 |
| Cut Tiles | (# tiles) | 30 | 30 |
| Cut Install time required | (hours) | 1.0 | 0.33 |

-continued

|  |  | Prior Art | Present Invention |
|---|---|---|---|
| Install time saved | (hours) | 0.0 | 0.67 |
| Labor cost (2 men) | ($15/hr) | $240.00 | $219.90 |
| Labor savings |  | 0.00 | $20.10 |
| Labor savings |  | 8% | |
| Job income |  | $400.00 | $400.00 |
| Profit earned |  | 160.00 | 180.10 |
| Increased profits |  | 13% | |

It is clear that the more challenging the installation (geometrically complicated residential and smaller areas), the more advantageous is the present invention to the installer.

The embodiments of the invention in which an exclusive property or privilege is claimed are defined as follows:

1. An assembly for heating vinyl composition tiles, having top and bottom faces, for cutting by an installer, comprising:

a housing mounted on wheel means for rolling movement, said housing having at least one open side and forming an internal chamber;

a stack of vertically spaced, horizontally oriented, heat conductive trays affixed to the housing within the chamber, said tray providing an upper heat transferring surface operative to contact and support substantially the entire bottom face of the tile so that substantially the entire area of the tile will be uniformly and conductively heated, the spacing between each pair of trays being sufficient to accommodate a tile and allow an installer to grasp and remove a tile;

a plurality of discrete heating elements, one for each tray, each heating element being in thermal engagement with substantially the entire area of a tray's bottom surface for heating the tray conductively substantially uniformly across its width and length;

thermostatic control means for controlling the heat output of the heating elements;

the heating elements being operative to supply heat to the tiles through the trays as required to ensure sustainable, sequentially cyclic operation whereby if a fully heated tile from an originally fully loaded stack is removed and replaced with a replacement tile, then after all of the original tiles have been removed, cut and installed in sequence, the replacement tile will be ready for cutting.

2. The assembly as set forth in claim 1 wherein the stack has three trays.

3. The assembly as set forth in claim 1 comprising a plurality of mechanical tile extracting means, each associated with one of the trays, for engaging a heated tile, at its end opposite the housing's open side, whereby the tile can be pulled from the housing chamber and seized by the installer.

* * * * *